(12) United States Patent
Meier et al.

(10) Patent No.: US 10,250,021 B2
(45) Date of Patent: Apr. 2, 2019

(54) METHOD OF MANUFACTURING A HIGH-VOLTAGE DC CABLE JOINT, AND A HIGH-VOLTAGE DC CABLE JOINT

(71) Applicant: NKT HV Cables GmbH, Baden (CH)

(72) Inventors: Patrick Meier, Staufen (CH); Spiros Tzavalas, Espoo (FI); Thomas Christen, Birmenstorf (CH); Alexey Sokolov, Baden (CH); Jan Van-Loon, Wettingen (CH); Xavier Kornmann, Lauchringen (DE)

(73) Assignee: NKT HV Cables GmbH, Baden (CH)

( * ) Notice: Subject to any disclaimer, the term of this patent is extended or adjusted under 35 U.S.C. 154(b) by 93 days.

(21) Appl. No.: 15/537,713

(22) PCT Filed: Nov. 17, 2015

(86) PCT No.: PCT/EP2015/076752
§ 371 (c)(1),
(2) Date: Jun. 19, 2017

(87) PCT Pub. No.: WO2016/096276
PCT Pub. Date: Jun. 23, 2016

(65) Prior Publication Data
US 2018/0006439 A1   Jan. 4, 2018

(30) Foreign Application Priority Data

Dec. 19, 2014 (EP) ..................................... 14199380

(51) Int. Cl.
*H02G 1/14* (2006.01)
*B29C 45/00* (2006.01)
(Continued)

(52) U.S. Cl.
CPC .......... *H02G 1/145* (2013.01); *B29C 45/0001* (2013.01); *H02G 15/103* (2013.01); *C09D 183/04* (2013.01); *C09D 183/06* (2013.01)

(58) Field of Classification Search
CPC .. H02G 1/145; H02G 15/103; B29C 45/0001; C09D 183/04; C09D 183/06
See application file for complete search history.

(56) References Cited

U.S. PATENT DOCUMENTS 2,118,546 A * 5/1938 Beaver ................... H02G 15/24
174/21 R
2,142,884 A * 1/1939 Chaplin ................. H02G 15/24
174/106 R
(Continued)

FOREIGN PATENT DOCUMENTS

CN  1729545 A  2/2006
CN  101529682 A  9/2009
(Continued)

OTHER PUBLICATIONS

Ju-Na Hwang: "Influence of Nano-ATH on Electrical Performance of LSR for HVDC insulation", Apr. 30, 2014 (Apr. 30, 2014), XP055236534, Retrieved from the Internet: URL:http://www.isaet.com/publications/9997469/influence-of-nano-ath-on-electrical-performance-of-lsr-for-hvdc-insulation [retrieved on Jun. 12, 2017] 4 pages.
(Continued)

Primary Examiner — Timothy J Thompson
Assistant Examiner — Rhadames Alonzo Miller
(74) Attorney, Agent, or Firm — Whitmyer IP Group LLC

(57) ABSTRACT

A high-voltage DC cable joint including a multi-wall layered construction having individual concentrically arranged layers. The joint includes, from inside to outside, an inner conductive rubber layer, a field grading rubber layer made from a predetermined tailored formulation, an insulating
(Continued)

rubber layer and an outer conductive rubber layer. The field grading rubber layer separates and interconnects the conductive rubber layers, and wherein the rubber layers are cross-linked by a by-product-free manufacturing method. The cable joint is preferably made from platinum cured rubbers by moulding process steps. In a preferred embodiment the cable joint is made by injection moulding.

15 Claims, 1 Drawing Sheet

(51) Int. Cl.
  *C09D 183/04* (2006.01)
  *C09D 183/06* (2006.01)
  *H02G 15/103* (2006.01)

(56) References Cited

U.S. PATENT DOCUMENTS

| | | | | |
|---|---|---|---|---|
| 2,169,570 A * | 8/1939 | Ronci | | H02G 15/013 |
| | | | | 123/169 TC |
| 2,287,163 A * | 6/1942 | Bishop | | H02G 15/14 |
| | | | | 156/49 |
| 2,908,744 A * | 10/1959 | Bollmeier | | H02G 15/113 |
| | | | | 174/76 |
| 4,024,718 A * | 5/1977 | Roche | | E21B 7/128 |
| | | | | 114/258 |
| 4,032,214 A * | 6/1977 | McNerney | | H01R 13/523 |
| | | | | 29/870 |
| 4,518,632 A * | 5/1985 | Jones | | D01F 11/127 |
| | | | | 174/128.2 |
| 4,785,139 A * | 11/1988 | Lynch | | G02B 6/4465 |
| | | | | 138/121 |
| 5,125,061 A * | 6/1992 | Marlier | | G02B 6/4416 |
| | | | | 174/70 R |
| 5,125,062 A * | 6/1992 | Marlier | | G02B 6/4416 |
| | | | | 174/70 R |
| 5,278,358 A * | 1/1994 | Blondin | | G02B 6/3887 |
| | | | | 174/70 R |
| 5,286,921 A * | 2/1994 | Fontaine | | G01K 1/026 |
| | | | | 174/68.1 |
| 5,375,939 A * | 12/1994 | Brown | | H02G 15/007 |
| | | | | 24/122.3 |
| 5,520,422 A * | 5/1996 | Friedrich | | F16L 9/12 |
| | | | | 285/296.1 |
| 5,661,842 A * | 8/1997 | Faust | | H01R 4/72 |
| | | | | 174/93 |
| 5,801,332 A * | 9/1998 | Berger | | H02G 15/103 |
| | | | | 174/73.1 |
| 6,292,436 B1 * | 9/2001 | Rau | | G01V 1/201 |
| | | | | 114/245 |
| 2002/0168231 A1 * | 11/2002 | Hayakawa | | H02G 1/10 |
| | | | | 405/158 |
| 2004/0097131 A1 * | 5/2004 | Varreng | | H01R 13/523 |
| | | | | 439/587 |
| 2004/0160663 A1 * | 8/2004 | DeVincentis | | G02B 6/4428 |
| | | | | 359/333 |
| 2004/0196529 A1 * | 10/2004 | Young | | G02B 6/4428 |
| | | | | 359/333 |
| 2005/0036751 A1 * | 2/2005 | Young | | G02B 6/4428 |
| | | | | 385/100 |
| 2005/0105164 A1 * | 5/2005 | Young | | G02B 6/4428 |
| | | | | 359/333 |
| 2005/0139373 A1 * | 6/2005 | Gramespacher | | H02G 15/068 |
| | | | | 174/74 R |
| 2005/0179988 A1 * | 8/2005 | Young | | G02B 6/4428 |
| | | | | 359/333 |
| 2005/0185257 A1 * | 8/2005 | Young | | G02B 6/4428 |
| | | | | 359/333 |
| 2005/0191910 A1 * | 9/2005 | Bertini | | H01R 13/523 |
| | | | | 439/676 |
| 2005/0200943 A1 * | 9/2005 | DeVincentis | | G02B 6/4427 |
| | | | | 359/333 |
| 2005/0201709 A1 * | 9/2005 | DeVincentis | | G02B 6/4428 |
| | | | | 385/135 |
| 2005/0217882 A1 * | 10/2005 | Rizzuto, Jr. | | F16L 25/10 |
| | | | | 174/480 |
| 2007/0053645 A1 * | 3/2007 | Kordahi | | G02B 6/4428 |
| | | | | 385/135 |
| 2007/0269169 A1 * | 11/2007 | Stix | | G02B 6/3816 |
| | | | | 385/100 |
| 2007/0289779 A1 * | 12/2007 | Howard | | E21B 17/028 |
| | | | | 175/40 |
| 2009/0272561 A1 * | 11/2009 | Norde | | H02G 15/115 |
| | | | | 174/135 |
| 2011/0107834 A1 * | 5/2011 | Howard | | E21B 17/028 |
| | | | | 73/431 |
| 2011/0188803 A1 * | 8/2011 | Kordahi | | G02B 6/4428 |
| | | | | 385/24 |
| 2013/0170519 A1 * | 7/2013 | Alliot | | F16L 13/0272 |
| | | | | 374/161 |
| 2014/0135416 A1 * | 5/2014 | Igarashi | | C08K 3/36 |
| | | | | 522/83 |
| 2014/0166335 A1 * | 6/2014 | Kagoura | | H01B 7/045 |
| | | | | 174/107 |
| 2014/0270674 A1 * | 9/2014 | Cairns | | G02B 6/4441 |
| | | | | 385/135 |
| 2015/0234143 A1 * | 8/2015 | Smith | | G02B 6/4494 |
| | | | | 702/2 |
| 2016/0054535 A1 * | 2/2016 | Toth | | G02B 6/4428 |
| | | | | 385/135 |

FOREIGN PATENT DOCUMENTS

| | | |
|---|---|---|
| CN | 101585943 A | 11/2009 |
| CN | 102684174 A | 9/2012 |
| EP | 1870975 A1 | 12/2007 |
| EP | 2019466 A1 | 1/2009 |
| EP | 2026438 A1 | 2/2009 |
| WO | 0074191 A1 | 12/2000 |
| WO | 2005036563 A2 | 4/2005 |
| WO | 2007147755 A1 | 12/2007 |
| WO | 2008076058 A1 | 6/2008 |
| WO | 2013033603 A1 | 3/2013 |
| WO | 2014153637 A1 | 10/2014 |

OTHER PUBLICATIONS

International Preliminary Report on Patentability Application No. PCT/EP2015/076752 Completed: Dec. 5, 2016 8 pages.

Dr et al: "Magazine for the Polymer Industry UV-curing silicone rubbers 2 RFP UV-curing silicone rubbers", Dec. 31, 2013 (Dec. 31, 2013), XP055193747 Retrieved from the Internet: URL:http://www.momentive.com /uploadedFiles/Product_Literature/ Silicones/Elastomers/RFP.pdf [retrieved on Jun. 12, 2017], pp. 4-10, Momentive Performance Materials, USA.

Anders Gustafsson et al: "The new 525 kV extruded HVDC cable system World's most powerful extruded cable system High Voltage Cables Grid Systems Power Systems", ABB Grid Systems, Aug. 1, 2014 (Aug. 1, 2014), pp. 1-8, XP055141442, Retrieved from the Internet: URL:https://library.e.abb.com/public/7caadd110d270de5c1257d3b002ff3ee/The%20new%20525%20kV%20extruded%20HVDC%20cable%20system%20White%20PaperFINAL.pdf, Technical Paper, USA.

Chinese Office Action with translation Application No. 201580069562.4 dated Jul. 20, 2018 10 pages.

European Office Action Application No. 14199380.8 dated Jan. 24, 2018 6 pages.

Peroxide: "New From Dow Corning Silastic 1-part Platinum Rapid Cure HCR Compounds from Dow Corning", Dec. 31, 2002 (Dec. 31, 2002), Retrieved from the Internet: URL:http://www.dowcorning.com/content/rubber/45-1204-01.pdf [retrieved on Jun. 4, 2015].

Rubber World: "Rubber world", Jul. 31, 2013 (Jul. 31, 2013), Retrieved from the Internet: URL:http://www.hexion.com/uploadedFiles/

(56) References Cited

OTHER PUBLICATIONS

Product_Literature/Silicones/ Elastomers/Rubber%20World.pdf [retrieved on Jan. 24, 2017].

\* cited by examiner

METHOD OF MANUFACTURING A HIGH-VOLTAGE DC CABLE JOINT, AND A HIGH-VOLTAGE DC CABLE JOINT

TECHNICAL FIELD

The present invention relates to a method of manufacturing a high-voltage DC cable joint, and a high-voltage cable joint according to the preambles of the independent claims.

BACKGROUND

Power cables having an operating voltage of 6 kV or above typically comprise inner and outer conductive layers in the cable insulation for field equalization. In order to connect such cables with other cables or devices, individual elements of the cables are in the area of the cable ends gradually exposed or cut back, respectively, and enveloping devices or connecting devices known as cable fittings such as e.g. cable joints and cable terminations are arranged at the cable ends. The existence of a cut-back end of an outer conductive layer, leads to an increase in the electric field at this position in the operation of the respective cable. In order to guarantee a safe operation and in particular to make sure that the increase in the electric field does not lead to discharges, breakdowns or flashovers, the electric field is graded or controlled by suitable means and measures which are known as field control. In this respect, known cable fittings usually comprise corresponding field-control elements or field-control bodies.

High voltage direct current (DC) cable joints comprise typically a multi-wall structured tubular geometry (see FIG. 2) consisting of different kinds of material grades. The arrangement of the individual material layers and their design are selected in a way, that the core (cable) of the joint is insulated from the ground potential (outside) at normal operating conditions, and that field grading properties are achieved for prevention of local electrical field enhancement. See e.g. WO-00/74191, and WO-2007/147755.

WO-00/74191 relates to a device for controlling an electric field at a connection or a joint of a high-voltage cable for DC voltage. The electric field control is achieved by geometrical field control.

WO-2007/147755 also relates to a device for electric field control. The device has a layered structure comprising a resistive layer for field control, an insulating layer arranged on the resistive layer and a semi-conducting layer or conducting layer arranged on the insulating layer. The manufacturing of the device includes the steps of winding the resistive layer on a carrier and then grinding to a desired shape; winding the insulating layer outside the resistive layer and grinding it to a desired shape, and further on with the remaining layers.

Joints are often manufactured from EPDM (Ethylene Propylene Diene Monomer) rubber in multiple process steps. EPDM rubber is a type of synthetic rubber and is an elastomer which is characterized by a wide range of physical properties.

In the multiple process steps layers of different uncured EPDM rubber types are wound around a mandrel and cured sequentially under elevated temperature and under pressure in a surrounding steel mould (compression moulding). The individual material layers of such cable joints consist of material with different electrical properties. In a typical cable joint, which is illustrated in FIG. 2, there is (from inside to outside) a conductive layer 1 which is on high voltage potential, a field grading layer 2, an insulating layer 3 and a conductive layer 4 on the outside which is on ground potential. The field grading layer 2, consisting of EPDM rubber containing filler materials leading to the appropriate nonlinear electrical behaviour, has two main functions: Primarily it controls the electric field from the non-insulated cable ends at normal operation voltage. Secondly, it is designed to build-up space charges which supress local field enhancements in the case of over voltage, in order to protect attached electrical devices.

Following the above described manufacturing method and design recommendation, on an industrial scale, DC cable joints are produced in the range of 80 kV to 320 kV.

The advantages of these manufacturing techniques are e.g. that they are well-established, and that the process for low voltage ratings is efficient.

However, the current manufacturing method related to the processing of EPDM and the EPDM curing chemistry may be labour-intensive and thereby costly. One reason is that EPDM is already in the uncured stage a very highly viscous material and, as discussed above, is often wound in form of uncured EPDM wounds around a core (mandrel), or respectively around the precedent layer of the semi-finished joint. Subsequently, it is compression wound and cured under elevated temperature.

EPDM is cured by a radical curing reaction, initiated by peroxides as curing agents. During the curing step, the peroxides are decomposed into low molecular, volatile compounds. These by-products may negatively influence the electric properties of the EPDM rubber. Therefore, the cured EPDM cable joint has to be degassed to remove these volatile by-products.

U.S. Pat. No. 5,801,332 relates to an elastically recoverable silicone rubber splice cover comprising layers of insulating, semi-conductive and conductive silicone rubber, and in particular platinum catalyzed silicone rubber. The cover is produced by e.g. using injection molding technique.

US-2005/0139373 relates to a sleeve for a high-voltage cable and cable element provided with such a sleeve. The sleeve comprises a field control element made from a field strength-dependent material, e.g. silicone rubber, EPDM or natural rubber, by e.g. using an injection-molding process.

EP-2026438 and EP-2019466 relate to cable connection electric field control devices comprising an insulating body and a field-grading layer embedded in that body. Typical field grading materials that form the field grading layer may be silicone rubber or EPDM filled with semiconducting material particles.

The general object of the present invention is to achieve an improved high-voltage DC cable joint having optimal electrical and mechanical properties. And in addition an object is to achieve an improved manufacturing method resulting in an improved high-voltage DC cable joint where the degassing of volatile by-products is avoided.

SUMMARY

The above-mentioned objects are achieved by the present invention according to the independent claims.

An object with the invention is achieved by a method of manufacturing a high-voltage DC cable joint comprising a multi-wall layered construction having individual concentrically arranged layers, wherein the method comprises moulding the joint by the following moulding process steps:

A—moulding an inner conductive rubber layer on a mandrel,

B—moulding a field grading rubber layer made from a predetermined tailored material formulation on to said conductive rubber layer,
C—moulding an insulating rubber layer on to said field grading rubber layer, and
D—moulding an outer conductive rubber layer to be arranged on to said insulating rubber layer and on to said field grading rubber layer,
wherein the field grading rubber layer is configured to separate and to interconnect the conductive rubber layers, and wherein the rubber layers are cross-linked by a by-product-free manufacturing method.

According to an embodiment, the method comprises using as rubbers, platinum cured rubbers.

According to a further embodiment, the method comprises in one or more of said moulding process steps A-D injection moulding.

The insulating rubber layer may be a radiation curable rubber layer, and the method may comprise curing by using a radiation transparent mould.

Further, the method may comprise using, as said insulating rubber layer, an ultraviolet (UV) radiation curable rubber layer.

The method may comprise curing said insulating rubber layer by using an ultraviolet (UV) radiation transparent mould made from epoxy or polymethylmethacrylate (PMMA) based materials.

The method may comprise using, as said rubber material, silicone rubber.

A further object with the invention is achieved by a high-voltage DC cable joint comprising a multi-wall layered construction having individual concentrically arranged layers,
wherein the joint comprises, from inside to outside, an inner conductive rubber layer (1), a field grading rubber layer (2) made from a predetermined tailored material formulation, an insulating rubber layer (3), and an outer conductive rubber layer (4), wherein the field grading rubber layer is configured to separate and to interconnect the conductive rubber layers, and wherein the rubber layers are made from cross-linked rubbers by by-product-free moulding process steps.

The rubbers may be platinum cured rubbers.

According to one embodiment, one or more of said moulding process steps is/are injection moulding steps.

The insulating rubber layer may be an ultraviolet (UV) curable rubber layer.

According to one embodiment, the insulating rubber layer is cured by using an ultraviolet (UV) transparent mould made from epoxy or polymethylmethacrylate (PMMA) based materials.

The field grading rubber layer, made from said tailored material formulation, is characterized in that, at low electric field strengths, below a predetermined electric field strength, it has a conductivity higher than that of the insulating rubber layer at least by a factor of 10, and preferably by a factor of 100, but being sufficiently small to ensure negligible leakage current between the conductive rubber layers, and wherein said tailored material formulation is further characterized in that it has a nonlinear field grading property at voltages having an electrical field strength above said predetermined electrical field strength threshold, and wherein said tailored material formulation is tailored according to an electric breakdown field of adjacent materials and/or interfaces or triple points.

The predetermined electrical field strength may be between 1 and 20 kV/mm, preferably between 2 and 8 kV/mm.

Further, the rubber material may be silicone rubber.

The present invention disclosure relates to a high voltage DC cable joint which is made of a multi-layer rubber composite, wherein the different rubber layers have different electrical conductive properties. The obtained cable joint is characterized in that it has a high-voltage to ground connection by a field grading element and that one rubber layer has non-linear conductive properties. Furthermore, at least one rubber layer may preferably be cured by ultraviolet light, and the manufacturing process is characterized in that it is free of by-products. One advantage is that no degassing is required for releasing volatile low molecular by-products.

The non-degassing is due to the fact that all layers of the joint are made from rubbers that are cross-linked in a by-product-free manufacturing method. Preferably, platinum cured rubbers are used in moulding process steps. Using platinum cured rubbers is a by-product-free manufacturing method.

No peroxide is required as curing agents, and the cable joint is thus manufactured by applying a non-peroxide manufacturing curing method.

The field grading rubber material has a predetermined tailored formulation resulting in optimal mechanical and electrical properties.

According to one embodiment the cable joint is made from platinum cured silicone rubbers by injection moulding process steps. Preferably, the cable joint is made from by-product-free platinum cured silicone rubbers.

The manufacturing method provides an easy up-scalable manufacturing method for high voltage ratings, e.g. 500 kV When using injection moulding the manufacturing may be streamlined which results in reduced lead time, and in addition higher quality.

The manufacturing method according to the present invention is an environmentally sustainable solution in that no by-products, which may be gaseous, solid or liquid, need to be removed, e.g. degassed.

In one embodiment curing by ultraviolet (UV) light is performed which is a homogeneous curing process and can be carried out essentially without generation of heat. This is advantageous in that it enables easy up-scaling with minimal quality issues especially related to the insulation material. The final structure is fully and homogeneously cured even at high thicknesses e.g. 100 mm and above. This is rather significant for high voltage DC applications since inhomogeneous curing may lead to conductivity variation inside the insulation material. In addition the layers cured prior to the insulating layer are not subjected to long exposure at high temperatures as it would be the case if the insulation was thermally cured.

The taping process, referred to above in the background section, is quite labour intensive and time consuming. The method according to the present invention is more competitive even compared to other silicone rubber based concepts owing to the simple concentrically arranged layers design. This results in not only technically superior products with interconnected conductive rubber layers via a field grading rubber, but also to leaner, faster and less labour intensive manufacturing.

Further advantages are the simplified logistics and that simplified quality control may be performed and that there is less batch to batch variation. Especially compared to materials used for the taping process discussed above in the background section.

According to one embodiment the insulating rubber, preferably a silicone rubber, is characterized in that it is electrically insulating, UV-light transparent and UV-light curable. In addition, by applying UV-light curing of the insulation layer, the curing time will decrease.

For improving the adhesion between the different silicone rubber layers, a commercial silicone primer can be applied on each respective layer prior to the moulding process of the respective layer.

The mechanical material properties and the chosen geometrical design are optimized to guarantee a nearly constant radial force along the x-axis of the cable.

The electrical design of the joint is characterized by the existence of an electrical connection between the high voltage potential and ground at high fields. This is achieved by the integration of a field grading rubber layer, preferably a field grading silicone rubber layer that is in direct connection between high voltage potential and ground.

DETAILED DESCRIPTION

With reference to the appended figures the invention will now be described in detail.

Figure 1:
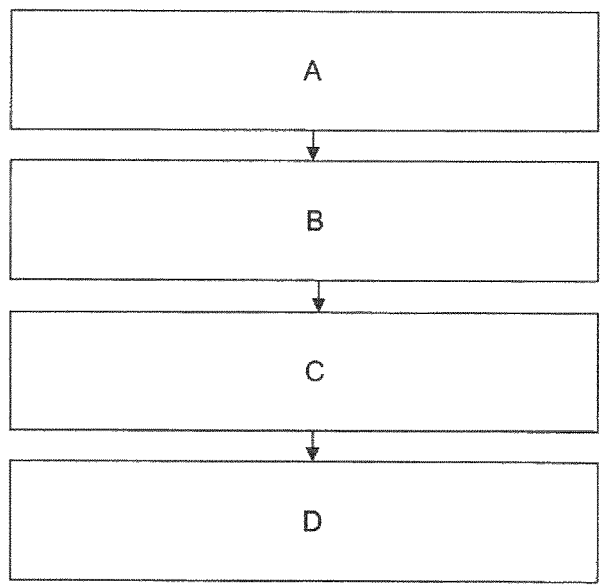
FIG. 1 is a flow diagram illustrating the manufacturing method according to the present invention.

First, it is referred to the flow diagram illustrating the manufacturing method shown in FIG. 1.

The invention relates to a method of manufacturing a high-voltage DC cable joint comprising a multi-wall layered construction having individual concentrically arranged layers. The cable joint has an elongated extension in the longitudinal direction of a cable around which the joint is to be arranged. A cross-sectional view of the cable joint is illustrated in FIG. 2.

Figure 2:
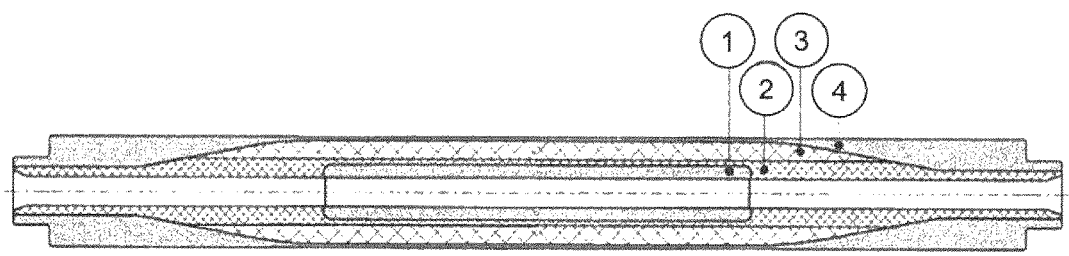
FIG. 2 is a schematic cross-sectional illustration of a joint according to the present invention.

Thus, the method comprises moulding the joint by applying the following moulding process steps:

A—moulding an inner conductive rubber layer 1 (FIG. 2).

For that purpose the conductive rubber layer 1 (FIG. 2) is moulded around a mandrel, which is integrated into a first metal mould, defining the geometry of the first rubber layer 1. This layer is preferably made from a conductive silicone rubber (e.g. carbon black filled) and is, according to one embodiment, thermally cured for 0.5-2 hours at about 100-120° C.

B—moulding a field grading rubber layer 2 made from a predetermined tailored material formulation on to the inner conductive rubber layer.

The field grading rubber layer 2 is moulded around the inner conductive layer 1 using a further metal mould, defining the outer geometry of the field grading rubber layer 2. According to one embodiment the curing is carried out as in step A.

C—moulding an insulating rubber layer 3 on to the field grading rubber layer. The insulating layer can also be the finally moulded layer in the case that the outer conductive layer is separately moulded and then inserted in the mould when moulding the insulation layer.

This insulating rubber layer is, according to one embodiment, a radiation curable rubber layer, and the method in such a case comprises curing by using an ultraviolet (UV) radiation transparent mould. Preferably, the insulating rubber layer is a UV radiation curable rubber layer. The radiation curing is a by-product-free process step.

Advantageously, the method comprises curing said insulating rubber layer by using a UV radiation transparent mould and in particular using a mould made from epoxy or polymethylmethacrylate (PMMA) based materials. The advantage of the UV-curing is to use a cheaper polymer mould, and a non-thermal, ultra-fast, curing step, using a light emitting diode (LED) UV-light source or a doped mercury lamp.

Alternatively, a conventional thermally curing silicone rubber, in a steel mould may also be used.

D—moulding an outer conductive rubber layer 4 to be arranged on to the insulating rubber layer and on said field grading rubber layer or it can be moulded separately and then inserted when moulding the insulation layer. The outer conductive rubber layer 4 consists again of a conductive rubber layer, which may be of the same or similar material as the inner conductive layer 1, and the same curing method as in step A is used.

The field grading rubber layer 2 separates and interconnects the inner and outer conductive rubber layers 1, 4 directly or via electric contact provided by an electrical connector between the outer conductive layer 4 and a cable insulation screen. Furthermore, all rubber layers are made from cross-linked rubbers in a by-product-free manufacturing method. Preferably, the cross-linked rubbers are platinum cured rubbers, and in particular platinum cured silicone rubbers.

With reference to FIG. 2 a middle part of the cable joint is defined as a part in the longitudinal direction having an extension of the insulating rubber layer 3. The end parts of the cable joint are the respective parts separated by the middle part. As seen from FIG. 2 the insulating layer 3 has an extension in the longitudinal direction of the cable joint enclosing the inner conductive rubber layer 1 and a middle part of the field grading rubber layer 2. The middle part of the field grading rubber layer 2 encloses in turn the inner conductive rubber layer 1. The outer conductive rubber layer 4 encloses directly the insulating rubber layer 3 at the middle part and also encloses directly the respective end parts of the field grading rubber layer 2. Thus, the outer conductive rubber layer 4 is separated from, and interconnected to, the inner conductive rubber layer 1, via the field grading rubber layer 2 at the end parts of the cable joint.

Optionally, primers may be used to improve the mechanical strength at the interfaces between the different layers. For that purpose, commercially available silicone rubber primers can be applied on to the outer surfaces of the respective layers prior to the moulding. The primers can be applied by spraying, dipping or brushing.

According to one advantageous embodiment, one or more of the moulding process steps is/are injection moulding steps.

Preferably, the method also comprises mixing insulating rubber and a field grading filler material to achieve the predetermined tailored material formulation, such that, in a specific example, the conductivity at low electrical field strength of up to 2 kV/mm is about $10^{-13}$ to $10^{-11}$ S/m and at electrical field strength above 4 kV/mm is about $10^{-7}$ to $10^{-9}$ S/m. The mixing of insulating rubber and field grading filler material is preferably performed prior to the steps A-D is performed, and at least prior to the moulding of the field graded rubber layer (step B) is made.

The field grading filler material is preferably a composite material comprising a ceramic material, consisting of small—substantially spherical ZnO particles. The ZnO particles are doped with different metal oxides, such as e.g. $Sb_2O_3$, $Bi_2O_3$, $Cr_2O_3$ and $Co_3O_4$ and are sintered at temperatures of between 900° C. and 1300° C. Like a varistor the sintered particles have non-linear electrical properties that depend on the electrical field strength. In the low field strength range the particles behave like an insulator, and with increasing field strength the particles become more conductive. Another applicable field grading filler material is silicon carbide (SiC).

According to one embodiment the rubber material used in all layers is silicone rubber. It is naturally also possible to use silicone rubber in one, two, or three layers.

In the following an advantageous manufacturing method of the cable joint will be disclosed.

The cable joint is manufactured by moulding process steps, preferably injection moulding, wherein platinum cured silicone rubbers are used.

In a platinum-based silicone rubber cure system, also called an addition system (because platinum is added to the system as a catalyst and simultaneously there are no by-products) two separate components must be mixed to catalyse the polymers. One component contains a platinum complex which must be mixed with a second, a hydride- and a vinyl-functional siloxane polymer, creating an ethyl bridge between the two. Such silicone rubbers cure quickly, though the rate of or even ability to cure may easily be inhibited by the presence of elemental tin, sulphur, and many amine compounds.

Thus, platinum cured silicone rubbers cure without the emission of volatile by-products. Hence, no degassing step is required and therefore the manufacturing process becomes "degassing free".

The present invention also relates to a high-voltage DC cable joint comprising a multi-wall layered construction having individual concentrically arranged layers manufactured in accordance with the manufacturing method described above. This cable joint will now be described in detail with reference to FIG. 2.

The cable joint is elongated along the common longitudinal axes of the two cables being connected to each other, and so that the connection between the two cables is protected by the cable joint.

The joint comprises, from inside to outside, an inner conductive rubber layer 1, a field grading rubber layer 2 made from a predetermined tailored material formulation, an insulating rubber layer 3 and an outer conductive rubber layer 4.

The field grading rubber layer 2 separates and interconnects the conductive rubber layers, and wherein all rubber layers are cross-linked in by-product-free moulding process steps. In one embodiment one or more of the moulding process step(s) is/are injection moulding steps.

According to one embodiment the rubbers are platinum cured rubbers. The rubber material of the different layers is preferably silicone rubber.

In an advantageous embodiment the insulating rubber layer is a UV curable silicone rubber layer, and the layer is cured by using a UV transparent mould using a mould made from epoxy or PMMA based materials.

The field-grading layer is referred to as a layer comprising a material the electric conductivity of which depends of the strength of an electric field to which it is subjected. Thus, it may be referred to as a layer comprising a material with non-linear current/voltage characteristics.

The tailored material formulation of the field grading layer is characterized in that at low electric field strengths, below a predetermined electric field strength, it has an electrical conductivity higher than that of the insulating rubber layer at least by a factor of 10, and preferably by a factor of 100, but being sufficiently small to ensure negligible leakage current between the conductive rubber layers.

The tailored material formulation is tailored according to an electric breakdown field of adjacent materials and/or interfaces or triple points (i.e. where three layers meet), and is further characterized in that it has a nonlinear field grading property at voltages having an electrical field strength above the predetermined electrical field strength threshold, and wherein the predetermined electrical field strength threshold is typically between 1 and 20 kV/mm, preferably between 2 and 8 kV/mm.

The predetermined tailored formulation comprising insulating rubber and a field grading filler material, such that, in a specific example, the conductivity at a low electrical field strength of up to about 2 kV/mm is about $10^{-13}$ to $10^{-11}$ S/m and at an electrical field strength above 4 kV/mm is about $10^{-7}$ to $10^{-9}$ S/m. Examples of field grading filler materials have been given above.

According to one specific embodiment the predetermined tailored material formulation comprises 30-40 w % insulating silicone, 2-12 w % conductive silicone and 50-60 w % of a predetermined field grading filler material.

The conductive rubber layer is made from a conductive rubber formulation that is characterized in that it has a volume resistivity below 100 Ωm, and preferably below 50 Ωm.

In the following an advantageous high-voltage cable joint will be disclosed.

The joint consists of a multi-wall layered silicone rubber construction, as shown in FIG. 2. There are different kinds of silicone rubbers used, which are characterized by different electrical and mechanical properties. From inside to outside, the joint consists of an inner conductive (deflector) layer 1, a field grading layer 2, an insulating layer 3 and an outer conductive silicone (ground) layer 4. For the conductive and insulating silicone rubbers, commercially available silicone rubber grades are used. The mechanical properties, particularly the Young's modulus, can be tuned individually by adding filler particles, as for instance ATH (alumina trihydrate), to match the comprehensive mechanical design requirements of the whole joint.

The insulating rubber layer may be made of an insulating rubber formulation that has a volume resistivity higher than $10^{12}$ Ωm.

The silicone field grading element is a tailored material formulation, with non-linear dependence of the current density on the electrical field at electrical field values beyond the operating field. In one exemplary embodiment it consists of insulating silicone (30-40 w %), conductive silicone (2-12 w %), and filler particles (50-60 w %) which lead to the wanted non-linear behaviour.

Essentially, the electric non-linear behaviour is adjusted in the way that the material has insulating properties, but still with a conductivity larger (by a factor of 10-100) than the joint and cable insulators, at electrical fields similar to operating conditions (typically up to about 2 kV/mm). For field strengths above 2 kV/mm, the material turns much more conductive, and results in a limitation of local field enhancements.

In one specific example, the resulting field grading material has typically a conductivity at low fields up to 2 kV/mm of about $10^{-13}$ to $10^{-11}$ S/m and at fields above 4 kV/mm of about $10^{-7}$ to $10^{-9}$ S/m.

By featuring the cable joint with this arrangement of the individual silicone rubber layers, it is possible to protect connected electrical devices against damages caused by overvoltage, triggered for example by lightning impulses or by technical defects.

From a mechanical point of view, the joint design is optimized to obtain nearly homogenous mechanical properties along the x-axis (i.e. in the longitudinal direction of the cable). This is achieved by optimizing the mechanical design and material properties accordingly. Providing the cable joint with this feature, the force on the imbedded cable is almost constant along the whole x-axis.

In one advantageous embodiment, as discussed above, the rubber material is a silicone rubber material. In order to further describe this embodiment, different aspects of silicone rubber will be discussed in the following.

Silicones are polymers that include silicon together with carbon, hydrogen, oxygen, and sometimes additionally other elements. Silicones are inert, synthetic compounds with a variety of forms and uses. Typically heat-resistant and rubber-like, they are used in sealants, adhesives, lubricants, medical applications, cooking utensils, and in insulations.

More precisely silicones are mixed inorganic-organic polymers with the chemical formula $[R_2SiO]_n$, where R is an organic group such as methyl, ethyl, or phenyl. These materials consist of an inorganic silicon-oxygen backbone (—Si—O—Si—O—Si—O—) with organic side groups attached to the silicon atoms, which are four-coordinate.

In some cases, organic side groups can be used to link two or more of these —Si—O— backbones together. By varying the —Si—O— chain lengths, side groups, and crosslinking, silicones can be synthesized with a wide variety of properties and compositions.

According to one embodiment the manufacturing method comprises applying injection moulding when manufacturing the cable joint. Injection moulding of liquid silicone rubber (LSR) is a process to produce durable parts in high volume.

LSR is a high purity platinum curable silicone with low compression set, great stability and ability to resist extreme high and low temperatures ideally suitable for production of parts, where high quality is a must. Due to the thermosetting nature of the material, liquid silicone injection moulding requires special treatment, such as intensive distributive mixing, while maintaining the material at a low temperature before it is introduced into the heated cavity and vulcanized. Chemically, silicone rubber is a family of thermoset rubbers that have a backbone of alternating silicon and oxygen atoms and methyl or vinyl side groups. Silicone rubbers constitute about 30% of the silicone family, making them the largest group of that family. Silicone rubbers maintain their mechanical properties over a wide range of temperatures and the presence of methyl-groups in silicone rubbers makes these materials extremely hydrophobic.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of manufacturing a high-voltage DC cable joint comprising a multi-wall layered construction having individual concentrically arranged layers, and that the method comprises moulding the joint by the following moulding process steps:
   A—moulding an inner conductive rubber layer on a mandrel,
   B—moulding a field grading rubber layer made from a predetermined tailored material formulation on to said conductive rubber layer,
   C—moulding an insulating rubber layer on to said field grading rubber layer, and
   D—moulding an outer conductive rubber layer to be arranged on to said insulating rubber layer and on to said field grading rubber layer,
   wherein the field grading rubber layer is configured to separate and to interconnect the conductive rubber layers, and characterized in that the rubber layers are cross-linked by a by-product-free manufacturing method, and wherein the method comprises, prior to step B, mixing insulating rubber and a field grading filler material to achieve the predetermined tailored material formulation, such that the conductivity at low electrical field strength of up to 2 kV/mm is about $10^{-13}$ to $10^{-11}$ S/m and at electrical field strength above 4 kV/mm is about $10^{-7}$ to $10^{-9}$ S/m.

2. The method according to claim 1, wherein the method comprises using as rubbers, platinum cured rubbers.

3. The method according to claim 1, wherein the method comprises injection moulding in one or more of said moulding process steps A-D.

4. The method according to claim 1, wherein said insulating rubber layer is a radiation curable rubber layer, and wherein the method comprises curing by using a radiation transparent mould.

5. The method according to claim 1, wherein said method comprises using, as said insulating rubber layer, an ultraviolet (UV) radiation curable rubber layer.

6. The method according to claim 1, wherein the method comprises curing said insulating rubber layer by using an ultraviolet (UV) radiation transparent mould made from epoxy or polymethylmethacrylate (PMMA) based materials.

7. The method according to claim 1, wherein said method comprises using, as said rubber material, silicone rubber.

8. The method according to claim 2, wherein the method comprises injection moulding in one or more of said moulding process steps A-D.

9. A high-voltage DC cable joint comprising a multi-wall layered construction having individual concentrically arranged layers,
   characterized in that the joint comprises, from inside to outside, an inner conductive rubber layer, a field grading rubber layer made from a predetermined tailored material formulation, an insulating rubber layer, and an outer conductive rubber layer, wherein the field grading rubber layer is configured to separate and to interconnect the conductive rubber layers, and wherein the rubber layers are made from cross-linked rubbers by by-product-free moulding process steps, and wherein said field grading rubber layer, made from said tailored material formulation, is characterized in that, at low electric field strengths, below a predetermined electric field strength between 1 and 20 kV/mm, it has a conductivity higher than that of the insulating rubber layer at least by a factor of 10, and preferably by a factor of 100, but being sufficiently small to ensure negligible leakage current between the conductive rubber layers, and wherein said tailored material formulation is further characterized in that it has a nonlinear field grading property at voltages having an electrical field strength above said predetermined electrical field strength threshold, and wherein said tailored material formulation is tailored according to an electric breakdown field of adjacent materials and/or interfaces or triple points.

10. The high-voltage DC cable joint according to claim 9, wherein said rubbers are platinum cured rubbers.

11. The high-voltage DC cable joint according to claim 9, wherein one or more of said moulding process steps is/are injection moulding steps.

12. The high-voltage DC cable joint according to claim 9, wherein said insulating rubber layer is an ultraviolet (UV) curable rubber layer.

13. The high-voltage DC cable joint according to claim 9, wherein said insulating rubber layer is cured by using an ultraviolet (UV) transparent mould made from epoxy or polymethylmethacrylate (PMMA) based materials.

14. The high-voltage DC cable joint according to claim 9, wherein said predetermined electrical field strength is between 2 and 8 kV/m m.

15. The high-voltage DC cable joint according to claim 9, wherein said rubber material is silicone rubber.

* * * * *